United States Patent [19]
Aoyama

[11] Patent Number: 6,130,528
[45] Date of Patent: *Oct. 10, 2000

[54] SWITCHING REGULATOR CONTROLLING SYSTEM HAVING A LIGHT LOAD MODE OF OPERATION BASED ON A VOLTAGE FEEDBACK SIGNAL

[75] Inventor: Takashi Aoyama, Aichi, Japan

[73] Assignee: Kabushiki Kaisha Toyoda Jidoshokki Seisakusho, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/074,502

[22] Filed: May 8, 1998

[30] Foreign Application Priority Data

May 9, 1997 [JP] Japan ................... 9-119185

[51] Int. Cl.$^7$ ................ G05F 1/56; G05F 1/49
[52] U.S. Cl. ........................ 323/282; 323/285
[58] Field of Search ................. 323/282, 284, 323/285

[56] References Cited

U.S. PATENT DOCUMENTS

| | | | |
|---|---|---|---|
| 3,458,798 | 7/1969 | Fang et al. | 321/43 |
| 3,579,091 | 5/1971 | Clarke et al. | 323/22 |
| 3,581,186 | 5/1971 | Weinberger | 321/43 |

(List continued on next page.)

FOREIGN PATENT DOCUMENTS

| | | |
|---|---|---|
| 0 428 377 A2 | 5/1991 | European Pat. Off. . |
| 0 428 377 B1 | 5/1991 | European Pat. Off. . |
| 90312367 | 5/1991 | European Pat. Off. . |
| 60-32565 | 2/1985 | Japan . |
| 60-156269 | 8/1985 | Japan . |
| 3-113986 | 11/1991 | Japan . |
| H4-42771 | 2/1992 | Japan . |
| H4-101286 | 9/1992 | Japan . |

OTHER PUBLICATIONS

Harris Semiconductor Data Sheet, "HIP5060 Power Control IC Single Chip Power Supply," Jan. 1992.
Harris Semiconductor App Note, "HIP5060 Power Control IC Single Chip Power Supply," Apr. 1994.
Linear Technology Corporation, Application Note 25, Switching Regulator for Poets. Sep. 1987.
Linear Technology Corporation, Application Note 29, Some Thoughts on DC–DC Converters. Oct. 1988.
Linear Technology Application Note 35, Step Down Switching Regulators. Aug. 1989.
Linear Technology Corporation Data Sheet, "LT1524/LT3524 SG1425/SG3524 Regulating Pulse Width Modulator" 1990.
Linear Technology Corporation Data Sheet, "LT1432 5V High Efficiency Step–Down Switching Regulator" 1992.

(List continued on next page.)

*Primary Examiner*—Peter S. Wong
*Assistant Examiner*—Bao Q. Vu
*Attorney, Agent, or Firm*—Woodcock Washburn Kurtz Mackiewicz & Norris LLP

[57] ABSTRACT

A comparator compares a control voltage obtained by amplifying the difference between an output voltage of a DC voltage outputting circuit and a reference voltage, with the voltage between both ends of a sense resistor. The result of this comparison is input to the reset terminal "R" of a flip-flop circuit as a reset signal. For example, if a light load is connected to the DC voltage outputting circuit, the control voltage to be output to the comparators via an amplifier will drop and the output voltage of the DC outputting circuit will rise. Therefore, a threshold voltage is provided to another comparator to which the control voltage is input, and a set pulse signal is not output to the set terminal "S" of the flip-flop circuit if the control voltage is not equal to or higher than the threshold voltage. As a result, the average value of the control voltage can be raised by the value of the threshold voltage, and the voltage rising of the DC voltage outputting circuit can be suppressed in comparison with the conventional system, thereby improving a load regulation.

7 Claims, 5 Drawing Sheets

U.S. PATENT DOCUMENTS

| | | | |
|---|---|---|---|
| 3,582,758 | 6/1971 | Gunn | 321/47 |
| 3,624,405 | 11/1971 | Bishop et al. | 307/33 |
| 3,699,424 | 10/1992 | Hart et al. | 321/11 |
| 3,733,540 | 5/1973 | Hawkins | 321/47 |
| 3,737,755 | 6/1973 | Calkin et al. | 321/2 |
| 3,781,505 | 12/1973 | Steigerwald | 219/10.49 |
| 3,816,809 | 6/1974 | Kuster | 321/14 |
| 3,820,005 | 6/1974 | Steigerwald | 321/18 |
| 3,863,128 | 1/1975 | Wilwerding | 320/21 |
| 3,978,393 | 8/1976 | Wisner et al. | 323/17 |
| 3,989,995 | 11/1976 | Peterson | 321/2 |
| 4,013,939 | 3/1977 | Biess et al. | 323/17 |
| 4,035,710 | 7/1977 | Joyce | 363/37 |
| 4,071,884 | 1/1978 | Maigret | 363/21 |
| 4,107,596 | 8/1978 | Weaver et al. | 323/17 |
| 4,129,788 | 12/1978 | Chavannes | 307/11 |
| 4,160,288 | 7/1979 | Stuart et al. | 363/41 |
| 4,161,023 | 7/1979 | Goffeau | 363/124 |
| 4,200,830 | 4/1980 | Oughton et al. | 320/32 |
| 4,244,050 | 1/1981 | Weber et al. | 371/66 |
| 4,288,831 | 9/1981 | Dolikian | 361/92 |
| 4,301,398 | 11/1981 | Johnson | 320/21 |
| 4,302,805 | 11/1981 | Marez et al. | 363/91 |
| 4,315,304 | 2/1982 | Marez et al. | 363/49 |
| 4,323,840 | 4/1982 | Gawler | 323/287 |
| 4,326,245 | 4/1982 | Saleh | 363/79 |
| 4,395,675 | 7/1983 | Toumani | 323/271 |
| 4,413,224 | 11/1983 | Krupka et al. | 323/222 |
| 4,428,015 | 1/1984 | Nesler | 361/18 |
| 4,438,485 | 3/1984 | Voigt | 363/21 |
| 4,462,069 | 7/1984 | Becky | 363/23 |
| 4,479,174 | 10/1984 | Cates | 363/21 |
| 4,488,057 | 12/1984 | Clarke | 307/66 |
| 4,493,017 | 1/1985 | Kammiller et al. | 363/132 |
| 4,519,024 | 5/1985 | Federico et al. | 363/127 |
| 4,538,101 | 8/1985 | Shimpo et al. | 323/272 |
| 4,541,041 | 9/1985 | Park | 363/41 |
| 4,549,254 | 10/1985 | Kissel | 363/21 |
| 4,578,630 | 3/1986 | Grosch | 323/271 |
| 4,585,986 | 4/1986 | Dyer | 363/173 |
| 4,586,119 | 4/1986 | Sutton | 363/173 |
| 4,610,521 | 9/1986 | Inoue | 354/145.1 |
| 4,631,652 | 12/1986 | Wendt | 363/16 |
| 4,634,956 | 1/1987 | Davis et al. | 323/222 |
| 4,639,845 | 1/1987 | Persson et al. | 363/26 |
| 4,649,464 | 3/1987 | Shono | 363/21 |
| 4,672,303 | 6/1987 | Newton | 323/285 |
| 4,672,518 | 6/1987 | Murdock | 363/21 |
| 4,706,177 | 11/1987 | Josephson | 363/24 |
| 4,709,234 | 11/1987 | Forehand et al. | 340/856 |
| 4,709,315 | 11/1987 | Ramos | 363/21 |
| 4,709,320 | 11/1987 | Konopka | 363/56 |
| 4,713,740 | 12/1987 | Drabing | 363/17 |
| 4,716,514 | 12/1987 | Patel | 363/127 |
| 4,727,308 | 2/1988 | Huljak et al. | 323/222 |
| 4,734,771 | 3/1988 | Lendaro et al. | 358/190 |
| 4,745,535 | 5/1988 | Sugishima et al. | 363/19 |
| 4,754,385 | 6/1988 | McDade et al. | 363/16 |
| 4,761,722 | 8/1988 | Pruitt | 363/17 |
| 4,775,821 | 10/1988 | Sikora | 315/219 |
| 4,779,027 | 10/1988 | Sikora | 315/127 |
| 4,801,859 | 1/1989 | Dishner | 323/224 |
| 4,808,946 | 2/1989 | Carver et al. | 330/297 |
| 4,809,150 | 2/1989 | Limuti et al. | 363/21 |
| 4,813,066 | 3/1989 | Holtz et al. | 379/413 |
| 4,814,684 | 3/1989 | McCurdy | 323/222 |
| 4,819,122 | 4/1989 | Gontowski, Jr. | 361/93 |
| 4,823,070 | 4/1989 | Nelson | 323/285 |
| 4,825,028 | 4/1989 | Smith | 219/10.55 B |
| 4,825,144 | 4/1989 | Alberkrack et al. | 323/272 |
| 4,843,532 | 6/1989 | Freedman | 363/26 |
| 4,866,587 | 9/1989 | Wadlington | 363/16 |
| 4,870,555 | 9/1989 | White | 363/21 |
| 4,873,408 | 10/1989 | Smith et al. | 219/10.55 |
| 4,884,183 | 11/1989 | Sable | 363/41 |
| 4,902,957 | 2/1990 | Cassani et al. | 323/222 |
| 4,906,901 | 3/1990 | Carroll | 315/297 |
| 4,922,404 | 5/1990 | Ludwig et al. | 363/89 |
| 4,928,200 | 5/1990 | Redl et al. | 361/93 |
| 4,929,882 | 5/1990 | Szepesi | 323/222 |
| 4,931,716 | 6/1990 | Jovanovic et al. | 323/285 |
| 4,996,638 | 2/1991 | Orr | 363/21 |
| 5,028,861 | 7/1991 | Pace et al. | 323/284 |
| 5,029,269 | 7/1991 | Elliot et al. | 323/284 |
| 5,034,871 | 7/1991 | Okamoto et al. | 363/15 |
| 5,066,900 | 11/1991 | Bassett | 323/224 |
| 5,068,575 | 11/1991 | Dunsmore et al. | 315/241 |
| 5,072,171 | 12/1991 | Eng | 323/283 |
| 5,081,411 | 1/1992 | Walker | 323/326 |
| 5,097,196 | 3/1992 | Schoneman | 323/222 |
| 5,099,407 | 3/1992 | Thorne | 363/37 |
| 5,128,603 | 7/1992 | Wolfel | 323/282 |
| 5,130,561 | 7/1992 | Elliot et al. | 323/284 |
| 5,134,355 | 7/1992 | Hastings | 323/211 |
| 5,138,249 | 8/1992 | Capel | 323/283 |
| 5,142,217 | 8/1992 | Gontowski, Jr. | 323/272 |
| 5,144,547 | 9/1992 | Massamoto | 363/127 |
| 5,170,333 | 12/1992 | Niwayama | 363/21 |
| 5,177,676 | 1/1993 | Inam et al. | 363/80 |
| 5,182,810 | 1/1993 | Bartling et al. | 395/750 |
| 5,184,129 | 2/1993 | Fung et al. | 341/144 |
| 5,187,425 | 2/1993 | Tanikawa | 320/31 |
| 5,193,211 | 3/1993 | Nobusawa | 455/38.2 |
| 5,229,649 | 7/1993 | Nielsen et al. | 307/31 |
| 5,237,262 | 8/1993 | Ashley et al. | 323/284 |
| 5,237,606 | 8/1993 | Ziermann | 379/413 |
| 5,245,526 | 9/1993 | Balakrishnan | 363/97 |
| 5,260,861 | 11/1993 | Wert | 363/25 |
| 5,272,382 | 12/1993 | Heald et al. | 307/66 |
| 5,309,078 | 5/1994 | Cameron | 318/811 |
| 5,333,176 | 7/1994 | Burke et al. | 379/58 |
| 5,349,282 | 9/1994 | McClure | 320/32 |
| 5,355,077 | 10/1994 | Kates | 323/224 |
| 5,365,118 | 11/1994 | Wilcox | 327/109 |
| 5,367,247 | 11/1994 | Blocher et al. | 323/222 |
| 5,371,666 | 12/1994 | Miller | 363/98 |
| 5,376,830 | 12/1994 | Ashley et al. | 327/134 |
| 5,382,893 | 1/1995 | Dehnel | 320/32 |
| 5,396,412 | 3/1995 | Barlage | 363/89 |
| 5,402,200 | 3/1995 | Shrinkle et al. | 360/69 |
| 5,404,094 | 4/1995 | Green et al. | 323/282 |
| 5,408,150 | 4/1995 | Wilcox | 327/108 |
| 5,430,641 | 7/1995 | Kates | 363/133 |
| 5,461,301 | 10/1995 | Truong | 323/207 |
| 5,465,926 | 11/1995 | Brown | 246/34 B |
| 5,481,178 | 1/1996 | Wilcox et al. | 323/287 |
| 5,498,995 | 3/1996 | Szepesi et al. | 327/538 |
| 5,521,768 | 5/1996 | Shrinkle et al. | 360/69 |
| 5,528,132 | 6/1996 | Doluca | 323/284 |
| 5,532,524 | 7/1996 | Townsley et al. | 307/64 |
| 5,534,771 | 7/1996 | Massie | 323/285 |
| 5,539,630 | 7/1996 | Pietkiewicz et al. | 363/17 |
| 5,552,695 | 9/1996 | Schwartz | 323/271 |
| 5,569,998 | 10/1996 | Cowan | 320/21 |
| 5,576,941 | 11/1996 | Nguyen et al. | 363/21 |
| 5,596,315 | 1/1997 | Olds et al. | 340/825.03 |
| 5,617,015 | 4/1997 | Goder et al. | 323/282 |
| 5,670,866 | 9/1997 | Suzuki et al. | 323/289 |
| 5,731,694 | 3/1998 | Wilcox et al. | 323/287 |
| 5,745,352 | 4/1998 | Sandri et al. | 363/41 |
| 5,747,977 | 5/1998 | Hwang | 323/284 |
| 5,912,552 | 6/1999 | Tateishi | 323/285 |

OTHER PUBLICATIONS

Linear Technology Corporation Data Sheet, "LT1158 Half Bridge N–Channel Power MOSFET Driver" 1992 Databook.

Maxim, MAX782 Triple–Output Power–Supply Controller for Notebook Computers. May 1994.

Maxim, MAX786 Dual–Output Power–Supply Controller for Notebook Computers. May 1994.

Micro Linear, ML4873 Battery Power Control IC Dec. 1994.

National Semiconductor Data Sheet, LM1578/LM2578/LM3578 Switching Regulator.

RCA Data Sheet, Linear Integrated Circuits High–Reliability Slash (/) Series CA3094/ . . . CA3904A/ . . . CA3094B.

Unitrode Data Sheet, "UC1895, UC2895, UC3895 Synchronous Rectifier Buck PWM Controller," Sep. 1992.

Unitrode Data Sheet, "UC1895, UC2895, UC3895 Synchronous Rectifier Buck PWM Controller," Jan. 1993.

Archer, "Current drives synchronous rectifier," EDN Nov. 28, 1985 p. 279.

Blanc, "Designing DC/DC Converters with the Si9110 Switchmode Controller" Siliconix Inc. 1991.

Blanchard, et al., "MOSFETs, Schottky Diodes vie for LowVoltage–Supply Designs," EDN, Jun. 28, 1984. p. 197.

Borghi et al., "Discontinuous Conduction Mode Power Switching Regulator IC," PCI Oct. 1988 Proceedings, pp. 31–41.

Campbell, et al., "Some Applications of A Programmable Power Switch/Amplifier" RCA Application Note ICAN–6048.

Cassani,et al., "Sophisticated control IC Enhances 1MHz Current Controlled Regulator Performance" HFPC, May 1992, pp. 167–173.

Chetty, "IC timers control dc–dc converters" Electronics, Nov. 13, 1975 pp. 121 and 123.

Chryssis, "High–frequency switching power supplies," 1989 pp. 144–152, 180–181.

Fisher, et al., Performance of Low Loss Synchronous Rectifiers in a Series–Parallel Resonant DC–DC Converter. APEC 89 Fourth Annual IEEE Applied Power Electronics Conference and Exposiiton. Mar. 13–17, 1989 pp. 240–246.

Gauen, "Synchronous Rectifier Improves Step–Down Converter Efficiency" PCIM Apr. 1993 pp. 8–15.

Gontowsski & Neufeld, "Advanced New Integrated Circuits For Current–Mode Control," PESC, 1986, pp. 341–352.

Goodenough "Design Custom BICMOS Power/High Voltage Ics" Electronic Design Jul. 12, 1990 pp. 43–49.

Goodenough, "Dozing IC OP Amps wake up for input signal" Electronic Design. Dec. 5, 1991 pp. 49–54.

Goodenough "Synchronous Rectifier UPS PC Battery Life" Electronic Design Apr. 16, 1992 pp. 47–52.

Goodenough, "Low–Voltage Analog ICS wait in the Wings," Electronic Design, Sep. 3, 1992.

Gracie, "Intermittent Converter Saves Power," Electronic Design News, Sep. 1, 1989, p. 151.

Grant, et al., "Power Mosfets Theory and Applications" Wiley–Interscience Publication 1989.

Hnatek, "Design of Solid State Power Supplies" Third Edition,1989, pp. 65–70.

Hodgins and Wittlinger, "Harris Intelligent Power," Application Note AN9212.1 (1992), pp. 11–191—11–197.

Horowitz & Hill, "The Art of Electronics," Cambridge University Press. 1989, pp. 356–360.

Huffman, "Components, configuration, and common sense are keys to efficient regulators" EDN, Jul. 22, 1993 pp. 106–120.

Jamieson, "Technical Support Package on Synchronism Half–Wave Rectifier," NASA Tech Brief vol. 13, No. 7., Item #15, Jul. 1989, pp. 1–3.

Japanese Utility Model Publication No. 4–101286, "High Efficiency Power Supply Circuit," filed Jan. 17, 1991, published Sep. 1, 1992.

Kerridge, "Battery power breeds efficient regulators" EDN Mar. 18, 1993 pp. 103–108.

La Duca, et al. "Improved Single–Ended Regulated DC/DC Converter Circuit" PESC'75 IEEE Power Electronic Specialists Conference–1975 Jun. 9–11, 1975 pp. 177–187.

Lee et al, "Design of Switching Regulator with Combined FM and On–Off Control," IEEE Transactions on Aerospace and Electronic Systems, vol. AES–22, No. 6, Nov. 1986, pp. 725–731.

Lee, et al., "A 580 KHZ switching regulator using on–off control" Journal of the Institution of Electronic and Radio Engineers, vol. 57., No. 5 pp. 221–226. Sep./Oct. 1987.

Mansmann, et al., "Maximizing the Impact of Power IC's via a Time to Market CAD Driven Power ASIC Strategy" APEC'92 Seventh Annual Applied Power Electronics Conference and Exposition Feb. 23–27, 1992 pp. 23–27.

Massey, et al, "High Voltage Single–Ended DC–DC Converter" PESC'77 Record IEEE Power Electronics Specialists Conference–1977 Jun. 14–16, 1977 pp. 156–159.

Meakin, "The LM3578 Switching Power Regulator" Electronic Engineering Jul. 1986.

Myers, "200–kHz Power FET Technology in New Modular Power Supplies," Hewlett–Packard Journal, Aug. 1981.

Patel, "Using Bipolar Synchronous Rectifiers Improves Power Supply Efficiency, "The Power Source Conference, proceedings, Nov. 27–29, 1984.

Patel, "Bipolar synchronous rectifiers cut supply losses" EDN Apr. 4, 1985.

Quinnell, "Analog IC combines five functions for battery power management," EDN Apr. 23, 1992.

Redl, et al "Frequency Stabilization and Synchronization of Free–Running Current–Mode Controlled Converters," PESC '86 Record pp. 519–530.

Redl et at, Overload–Protection Methods For Switching––Mode DC/DC Converters: Classification, Analysis, and Improvements, PESC '87 Record, pp. 107–118.

Shepard, "Powering portable systems," EDN, Nov. 5, 1992 pp. 73–74.

Sokal & Redl, "Control Algorhythms and Circuit Designs For Optimally Fly Back–Charging and Energy–Storage Capacitor," (e.g., for a flash lamp), EEEE Catalog No. CH2853–0/90/0000/0295,1990, pp. 295–301.

Steigerwald, "High Frequency Resonant Transistor DC–DC Converters." IEEE Transaction on Industrial Electronics., vol. IE–31., No. 2., May 1984 pp. 181–191.

Taylor, "Fly Back Converter," Electronic Engineering, Jul., 1976.

Uchida, "Control Circuit For Switching Regulator," Japanese Inventor Associated Disclosed Technology Publication No. 92–2362, published Feb. 15, 1992.

Wilcox, "The LT1158: Low Voltage, N–Channel Bridge Design Made Easy" Linear Technology Vol. II No. 1, Feb. 1992 pp. 1–5.

Williams, "Micropower circuits assist low–current signal conditioning," EDN Aug. 6, 1987 pp. 123–132.

Williams, et al., "Precise converter designs enhance system performance," EDN Oct. 13, 1988 pp. 175–185.

Williams, et al., "Proper instrumentation eases low–power DC/DC–converter design," EDN Oct. 27, 1988 pp. 285–291.

Williams, et al., "Design dc/dc converters for power conservation and efficiency," EDN Nov. 10, 1988 pp. 209–224.

Williams, et al., "Switched–capacitor networks simplify dc/dc–converter designs," EDN Nov. 24, 1988.

Williams, "Basic principles and ingenious circuits yield stout switchers," EDN Jan. 18, 1990 pp. 151–166.

Williams, "Designing supplies for powering LCD backlighting," EDN Oct. 29, 1992 pp. 125–136.

Williams, et al., "Synchronized regulator produces coherent noise," EDN Design Ideas.

Williams, "1.5 to 5V converter supplies 200 mA," EDN Oct. 15, 1992 p. 139–140.

"Using Bipolar Synchronous Rectifiers Improves Power Supply Efficiency," pp. 12–88–94, Unitrode Semiconductor Products, Jun. 1985.

Figure 1 of the LTC Patent.5,481,178.

Dell schematic, Saturn 4.8V Main Converter. Oct. 1, 1992.

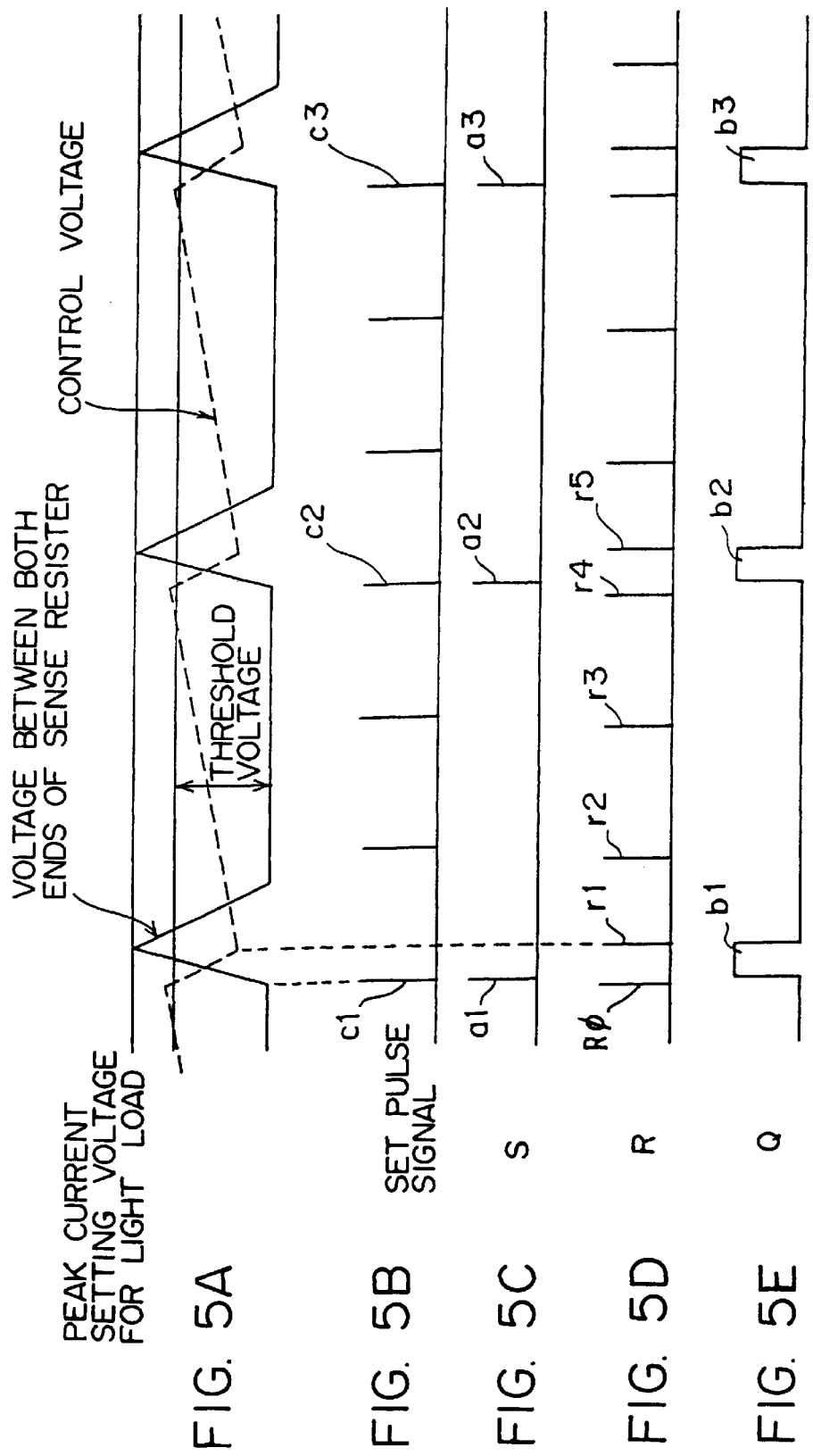

SWITCHING REGULATOR CONTROLLING SYSTEM HAVING A LIGHT LOAD MODE OF OPERATION BASED ON A VOLTAGE FEEDBACK SIGNAL

BACKGROUND OF THE INVENTION

1. Field of the Invention

The present invention relates to a switching regulator, and more particularly to a controlling system where efficiency degradation and an output voltage increase of a DC voltage outputting circuit are small when a light load is imposed.

2. Description of the Related Art

A DC/DC converter as a switching regulator adopts, for example, a bipolar transistor or a MOSFET as a switching means, and controls the duty factor of ON/OFF of the switching means in order to obtain a desired voltage output.

FIG. 1 is a circuit diagram showing a switching controlling circuit for controlling the duty factor of ON/OFF of the above described switching means. An input terminal 1 is input with, for example, an output voltage of a DC voltage outputting circuit. A voltage "Vfb" into which the above described output voltage is divided with dividing resistors R1 and R2 is input to one of input terminals of an amplifier 2. To the other of the input terminals of the amplifier 2, a reference voltage "Vref" is input. The amplifier 2 outputs the control voltage based on both of the inputs to an inversion input "−" of a comparator 3. The comparator 3 compares the voltage between both ends of a sense resistor, which is input to a non-inversion input terminal "+", with the above described control voltage, and generate a reset signal. Note that the voltage between both ends of the sense resistor is a voltage across a current detection sense resistor arranged, for example, in a DC/DC converter shown in FIG. 3.

When a heavy load is imposed, the voltage between both ends of the sense resistor is higher than a peak current setting voltage for a light load, and a comparator 7 outputs a high level signal. Accordingly, the reset signal output from the comparator 3 is input to a reset terminal "R" of a flip-flop circuit 6 via an AND gate 4 and an OR gate 5. Also the reset signal output from a reset pulse generating circuit 10 at predetermined intervals is input to the reset terminal "R" of the flip-flop circuit 6 via the OR gate.

When a light load is imposed, the comparator 7 outputs a low level signal until the voltage between both ends of the same resistor exceeds the peak current setting voltage for a light load. Therefore, the reset signal output from the comparator 3 is not input to the reset terminal "R" of the flip-flop circuit 6. However, the reset signal output from the reset pulse generating circuit 10 at predetermined intervals is input via the OR gate 5. Once the reset signal is input to the reset terminal "R" of the flip-flop circuit 6, the output terminal "Q" of the flip-flop circuit 6 outputs a low level signal, which is inverted by an inverter 11 and input to one of the terminals of the AND gate 9. Therefore, the reset signal of the comparator 3 remains to be input to the reset terminal "R" of the flip-flop circuit 6 via the AND gate 9 and the OR gate 5 until the reset signal of the comparator 3 is cancelled.

FIGS. 2A through 2E are timing charts for explaining the waveforms of the respective components of the switching controlling circuit in the above described state. FIG. 2A indicates the voltage between both ends of the sense resistor, the control voltage, and the peak current setting value respectively by a solid line, a dotted line, and a line-two dash-line. FIG. 2B indicates a set pulse signal to be input to the set terminal "S" of the flip-flop circuit 6; FIG. 2C indicates the output timing of the reset signal to be output from the reset pulse generating circuit 10; FIG. 2D indicates the reset signal to be input to the reset terminal "R" of the flip-flop circuit 6; and FIG. 2E indicates the output (of the output terminal?) "Q" of the flip-flop circuit 6.

As described above, this switching controlling circuit controls the duty factor of the output signal of the output (terminal?) "Q" of the flip-flop circuit 6 by using the reset signal to be input to the reset terminal "R" of the flip-flop circuit 6. The reset signal is generated by making a comparison between the voltage between both ends of the same resistor and the control voltage which is the output of the amplifier 2.

When a heavy load is imposed, the voltage between both ends of the sense resistor is controlled in order to be equal to the control voltage. However, when a light load is imposed, the comparator 7 makes a comparison between the peak current setting voltage for a light load and the voltage between both ends of the sense resistor in order to reduce the number of times that the switching means is turned off for preventing the efficiency from decreasing. The comparator 7 raises the voltage between both ends of the sense resistor up to the peak current setting voltage for a light load by turning on the switching means once. Therefore, the control voltage drops, which leads to further rising of the output voltage of the DC output circuit. As a result, the load regulation which is the fluctuation of the output voltage of the DC voltage outputting circuit due to light and heavy loads, is degraded with the conventional controlling system which prevents the efficiency from decreasing.

SUMMARY OF THE INVENTION

An object of the present invention is to provide a switching regulator controlling system for improving load regulation.

This object is achieved by providing a switching regulator controlling system comprising: a flip-flop circuit, which includes a set terminal and a reset terminal, for taking precedence over a reset; a control voltage generating means, to which the output voltage of the DC voltage outputting circuit obtaining a desired DC voltage output by making the duty factor of the output signal of the flip-flop circuit, for generating a control voltage according to the output voltage: a set pulse signal outputting means for making a comparison between the control voltage of the control voltage generating means and a predetermined threshold voltage, and outputting a set pulse signal to the set terminal of the flip-flop circuit based on the result of the comparison; and a reset signal outputting means for outputting a reset signal to the reset terminal of the flip-flop circuit, and controlling the output of the flip-flop circuit.

With this configuration, this controlling system can be adapted in such a way that the set pulse signal is not to be input to the set terminal of the flip-flop circuit, for example, if the control voltage does not exceed the threshold voltage. Since an ON signal is not output from the flip-flop circuit to the switching means implemented by, for example, a MOSFET, of the DC voltage outputting circuit in this case, the average value of the control voltage when a light load is imposed increases by the value of the threshold voltage in comparison with the conventional controlling system. Consequently, the load regulation is improved.

The above described set pulse outputting means is composed of, for example, a comparing means and an AND gate. When the control signal exceeds the threshold voltage, a set pulse signal is output from the comparing means to the AND gate and is output to the set terminal of the flip-flop circuit via the AND gate.

With this configuration, the comparing means outputs a low level signal to one of AND gates unless the control voltage exceeds the threshold voltage. Therefore, the set pulse signal is not output to the set terminal of the flip-flop circuit, from which the ON signal is not output to the switching means of the DC voltage outputting circuit. As a result, the average value of the control voltage when a light load is imposed rises by the value of the threshold voltage, thereby improving the load regulation.

BRIEF DESCRIPTION OF THE DRAWINGS

FIGS. 5A through 5E are timing charts explaining the operations performed by the switching controlling circuit according to the preferred embodiment.

DESCRIPTION OF THE PREFERRED EMBODIMENT

Figure 1:
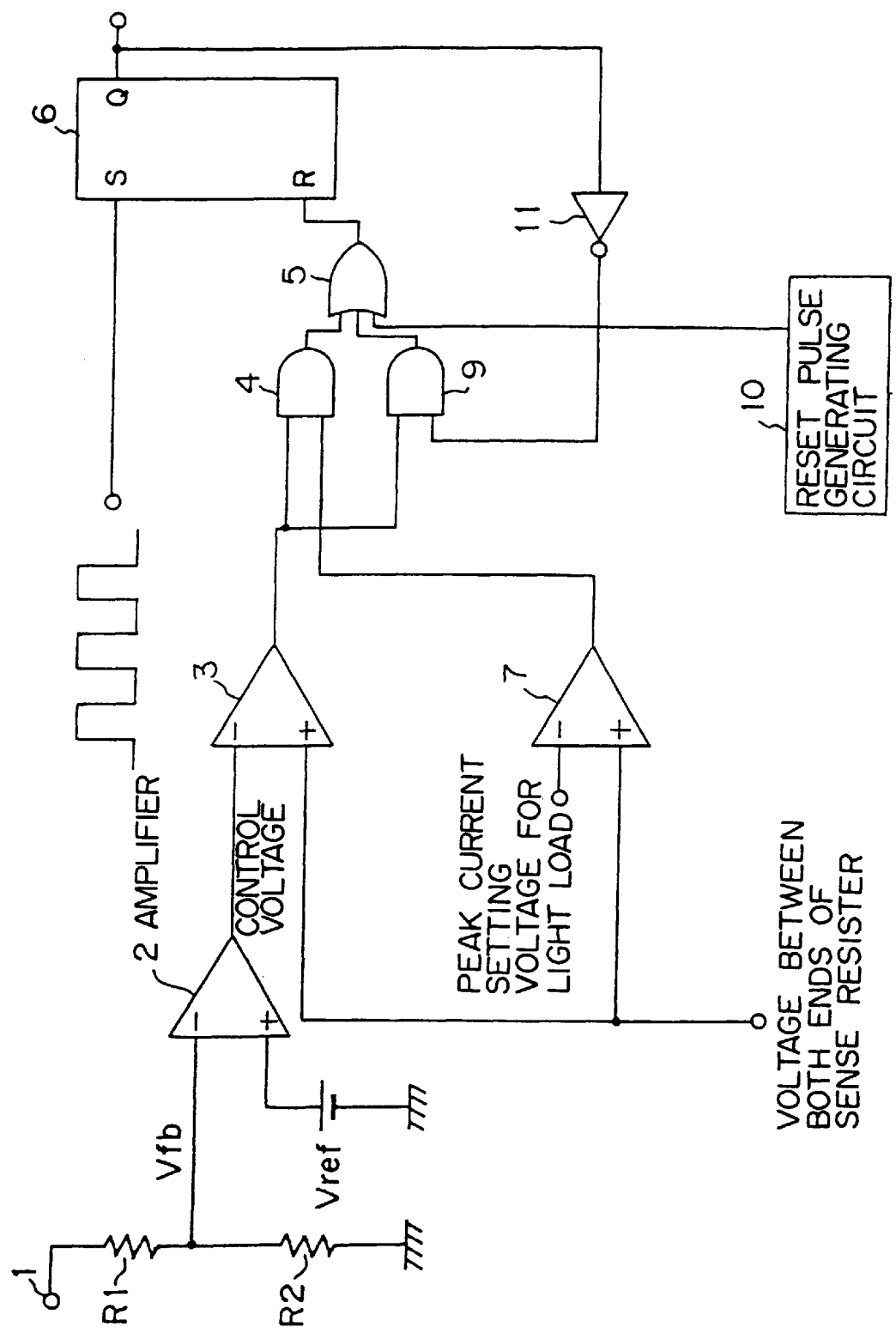
FIG. 1 is a circuit diagram showing a conventional switching controlling circuit.
Figure 2:
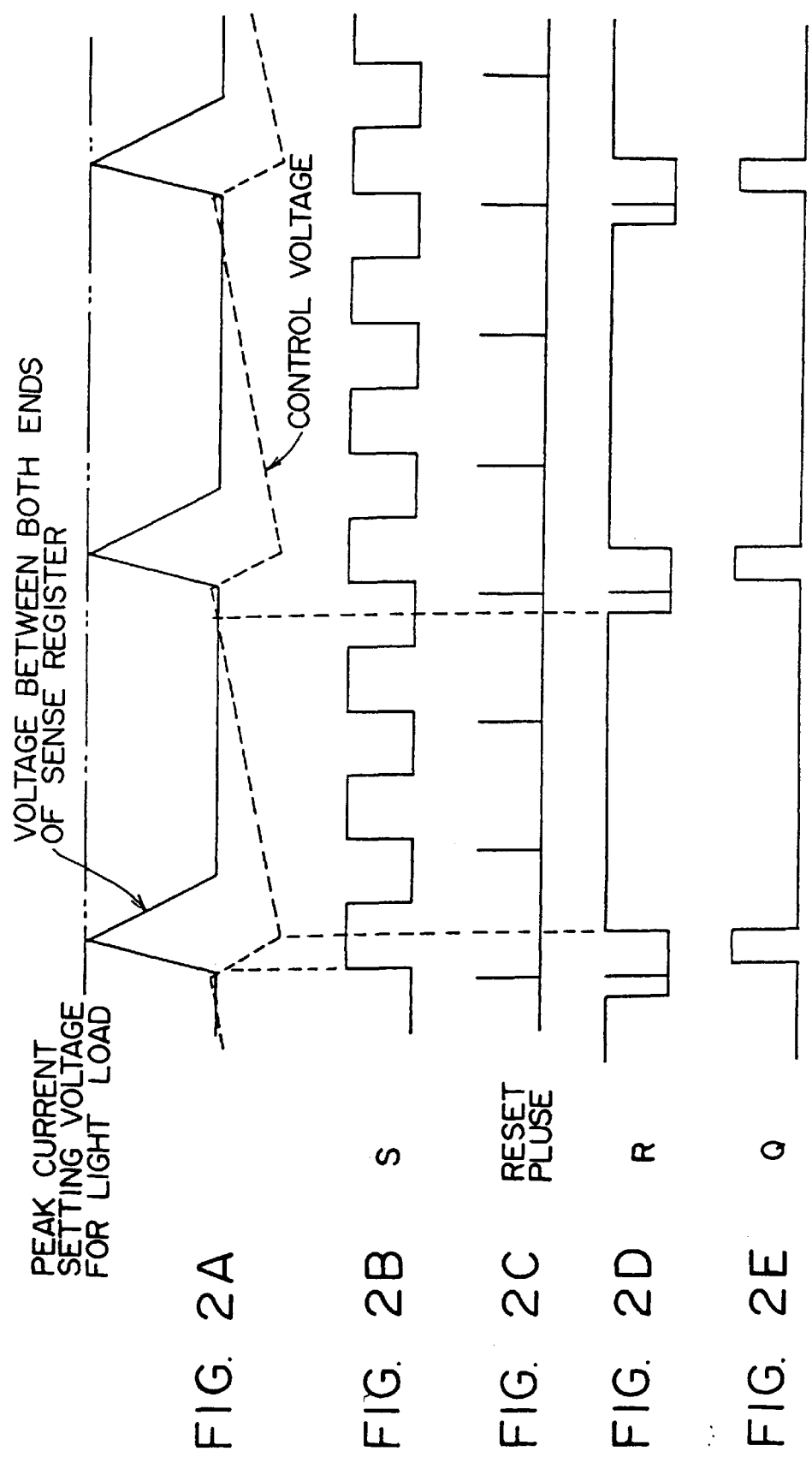
FIG. 2A through 2E are timing charts explaining the operations performed by the conventional switching control circuit.

Provided below is the explanation about the details of the preferred embodiment according to the present invention by referring to the drawings.

Figure 3:
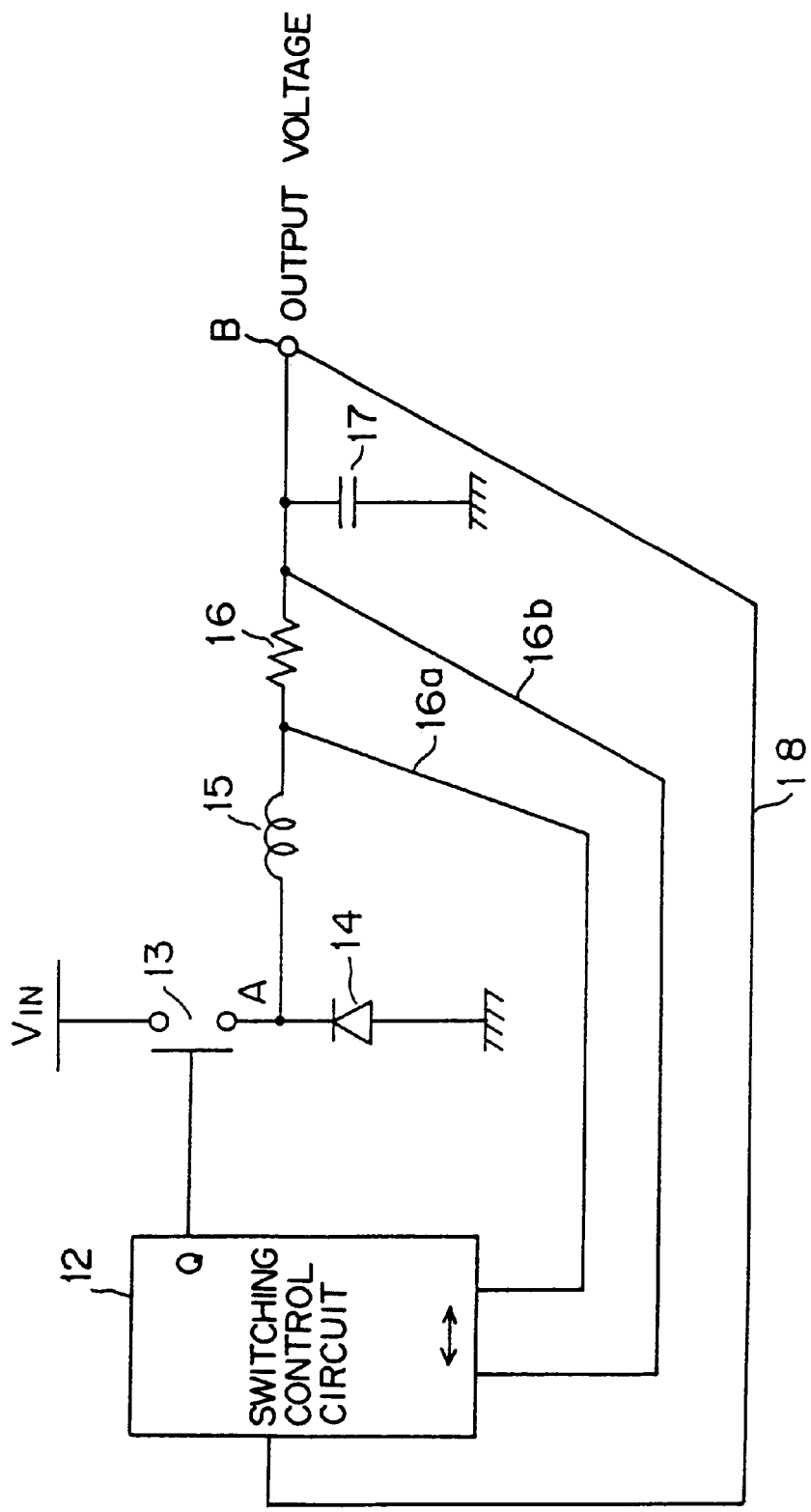
FIG. 3 is a circuit diagram showing a direct-current voltage outputting circuit including a switching controlling circuit according to a preferred embodiment.

FIG. 3 is a circuit diagram showing a direct-current voltage outputting circuit including a switching controlling circuit according to a preferred embodiment of the present invention. In this figure, 12 indicates a switching controlling circuit to be described later, which turns on/off a switching means 13 according to a control signal output from the output terminal "Q" of the switching controlling circuit 12. The switching means 13 is a switch implemented by, for example, a MOSFET, a bipolar transistor, etc. The switching means 13 is serially interposed between a DC power source (voltage $V^{IN}$) and a ground via a diode 14.

Between the connection point "A" at which the switching means 13 and the diode 14 are connected and the output terminal "B" of the DC voltage outputting circuit, an inductance 15 configured by a coil, a sense resistor 16, and a condenser 17 are connected. The voltage between both ends of the sense resistor 16 is output to the switching controlling circuit 12 via connection lines 16a and 16b. Also the output of the DC voltage outputting circuit is connected to a load, although this is not shown in this figure, and is fed back to the switching controlling circuit 12 via a connection line 18.

The DC voltage outputting circuit smoothes the voltage fluctuation at the connection point "A" by outputting a control signal from the output terminal "Q" of the switching controlling circuit 12 to the switching means 13, and obtains a desired output voltage from the output terminal "B". The output voltage obtained at this time is a voltage according to the control signal output from the switching controlling circuit 12. A desired output voltage can be obtained by varying the duty factor of the control signal.

Figure 4:
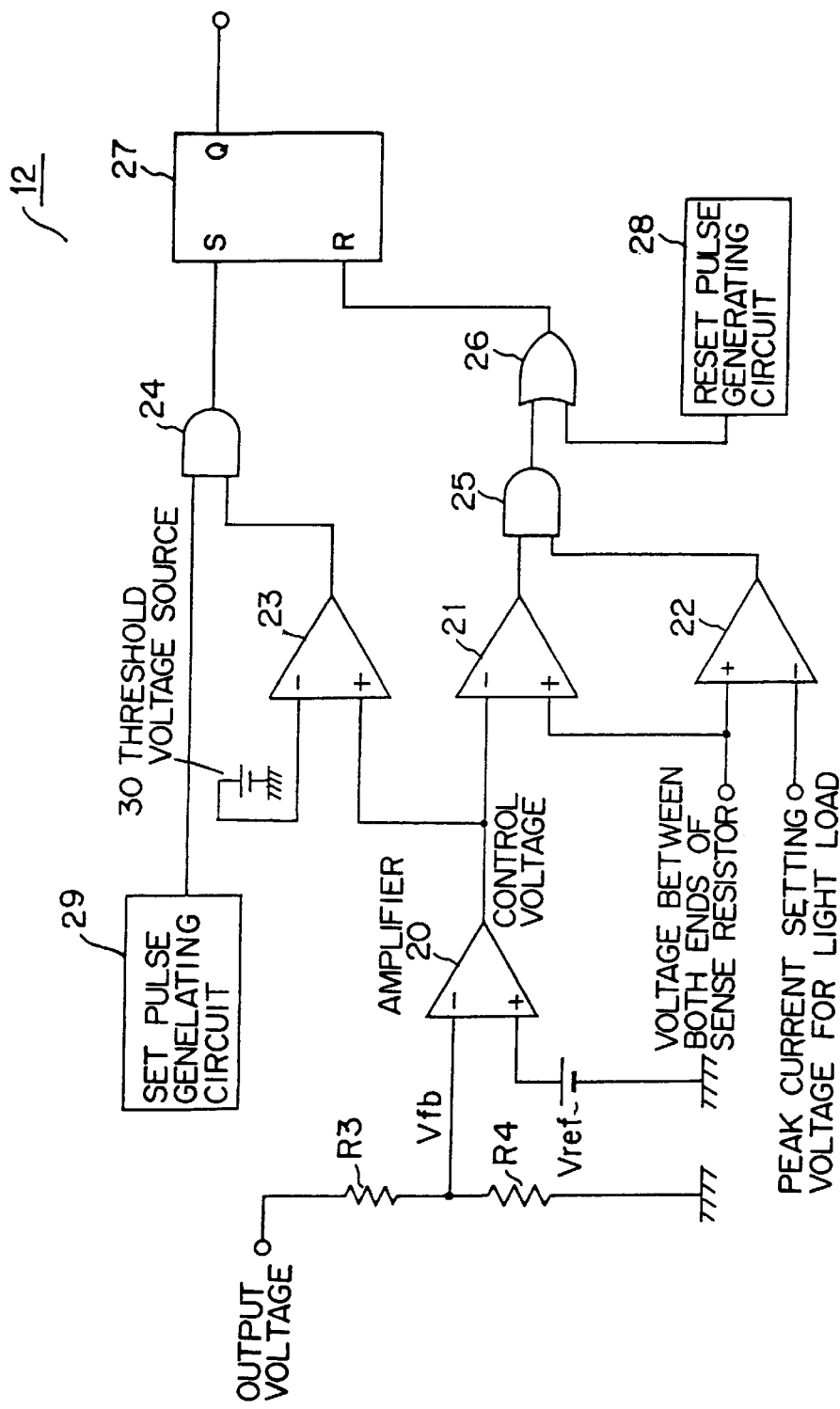
FIG. 4 is a circuit diagram showing the switching controlling circuit according to the preferred embodiment.

FIG. 4 is a circuit diagram showing the switching controlling circuit for outputting a control signal to the DC/DC converter DC voltage outputting circuit having the above described configuration.

In this figure, the switching controlling circuit 12 is composed of dividing resistors R3 and R4, a reference voltage source Vref, an amplifier 20, comparators 21 through 23, AND gates 24 and 25, an OR gate 26, a flip-flop circuit 27, a reset pulse generating circuit 28, a set pulse generating circuit 29, and a threshold voltage source 30. Note that the flip-flop circuit 27 is a flop-flop circuit which takes precedence over a reset. Its output terminal "Q" corresponds to the output terminal "Q" of the switching controlling circuit 12 shown in FIG. 3.

The amplifier 20 and the comparators 21 and 22 have the same configurations as those of the amplifier 2 and the comparators 3 and 7, which are shown in FIG. 1. Namely, the amplifier 20 and the comparator 21 divide the output voltage of the above described DC voltage outputting circuit by using dividing resistors R3 and R4. The amplifier 20 amplifies the different between a voltage "Vfb" and a reference voltage "Vref" based on these voltages so that a control voltage is generated. Additionally, the voltage between both ends of the sense resistor 16 shown in FIG. 3 is compared with the above described control voltage by using the comparator 21. If the former is higher than the latter, a reset signal is generated. Thus generated reset signal is output to the reset terminal "R" of the flip-flop circuit 27 via the AND gate 25 and the OR gate 26.

When a light load is imposed the comparator 22 outputs a low level signal to the AND gate until the voltage between both ends of the sense resistor 16 exceeds the peak current setting voltage for a light load. Accordingly, the reset signal output from the comparator 21 is not input to the reset terminal "R" of the flip-flop circuit 27 during that time period. In the meantime, since a short reset pulse of a predetermined cycle is output from the reset pulse generating circuit 28 to the reset terminal "R", the flip-flop circuit 27 is reset in every cycle. The timing at which the reset signal is input when a light load is imposed is only the timing at which the voltage between both ends of the sense resistor exceeds a predetermined voltage or the timing at which the pulse is input from the reset pulse generating circuit.

To the set terminal "S" of the flip-flop circuit 27, the AND gate 24 which partially structures the set pulse signal outputting means is connected, and the set pulse signal is input from the set pulse generating circuit 29 to one of input terminals of the AND gate 24. This set pulse signal is a pulse signal of a predetermined cycle, which is generated by the set pulse generating circuit 29. The other of the inputs input terminals of the AND gate 24 is connected with the comparator 23 which configures the set pulse signal outputting means. The inversion input terminal "−" of the comparator 23 is connected with a grounded threshold voltage source 30. The non-inversion input terminal "+" is connected with the amplifier 20.

Provided next is the explanation about the operations of the circuit according to the preferred embodiment.

FIGS. 5A through 5E are timing charts explaining the operations of the circuit according to the preferred embodiment when a light load is imposed. First, the set pulse signal is input to the AND gate 24 at the timing "c1" shown in FIG. 5B. Because the control voltage is higher than the threshold voltage, also the output of the comparator 23 is a high level output. As a result, a pulse signal "a1" is input to the set terminal "S" of the flip-flop circuit 27. After the pulse signal is input, the flip-flop circuit 27 outputs a high level signal to the switching means 13 of the DC voltage outputting circuit as the output "Q" (the output "b1" shown in FIG. 5E) until a reset signal is input.

If the voltage between both ends of the same resistor 16 exceeds the peak current setting voltage for a light load, a high level signal is output from the comparators 21 and 22 (the reset signal "r1" shown in FIG. 5D is output). In consequence, the flip-flop circuit 27 is reset. Accordingly, the flip-flop circuit 27 stops an ON output signal. Due to the stop of the ON output signal, the voltage between both ends of the sense resistor begins to drop, while the control voltage gradually begins to rise.

Then, the set pulse signal is input to the AND gate 24. Since the control voltage is equal to or lower than the threshold voltage, the output of the comparator 23 is a low level output. Therefore, the set pulse signal is not input to the set terminal "S" of the flip-flop circuit 27. Note that the reset signals (such as r2, r3, and r4, which are shown in FIG. 5D) are output from the reset pulse generating circuit 28 during also this time period.

If the control voltage again exceeds the threshold voltage, the output of the comparator 23 is driven high and the set pulse signal ("c2" shown in FIG. 5B) is input at this time. Consequently, the pulse signal ("a2" shown in FIG. 5C) is input to the set terminal "S". The voltage between both ends of the sense resistor 16 therefore exceeds the peak voltage, and the ON signal (the gate signal "b2" shown in FIG. 5E) is output from the flip-flop circuit 27 until a high level signal is output from the comparator 22 (until the reset signal "r5" shown in FIG. 5D is output).

Similarly, if the control voltage again exceeds the threshold voltage and the set pulse signal ("c3" shown in FIG. 5B) is input and provided, the pulse signal ("a3" shown in FIG. 5C) is input to the set terminal "S". As a result, the ON signal (the gate signal "b3" shown in FIG. 5E) is output from the flip-flop circuit 27 to the switching means 13 until the next reset signal is input.

As described above, the controlling system is adapted in such a way that the set pulse is not input to the flip-flop circuit 27 until the control voltage exceeds the threshold voltage when a light load is imposed. Therefore, the average value of the control voltage can be raised by the value of the threshold voltage. Consequently, the output voltage can be prevented from rising when a light load is imposed, thereby improving the load regulation accompanying light and heavy loads.

According to the above described preferred embodiment, a ramp wave for preventing a coil current from being generated is omitted for ease of explanation about the operations. However, the circuitry may be configured in such a way that the comparator 21 included in the switching controlling circuit of FIG. 4 according to the preferred embodiment is adapted to a three-input comparator, for which the ramp wave is further adopted.

As described above in detail, with the controlling system according to the present invention, the average value of the control voltage can be raised by the value of the threshold voltage when a light load is imposed, and the output voltage of the DC voltage outputting circuit can be prevented from rising, thereby improving the load regulation.

What is claimed is:

1. A switching regulator controlling system for suppling a regulated DC output voltage to a load under heavy load and light load conditions, comprising:

a switching circuit for switching between ON and OFF;

an output circuit for obtaining a regulated DC output voltage by varying a duty of said switching circuit, for generating an ON signal and an OFF signal, and for changing a rate of the ON signal time and the OFF signal time;

a control voltage generating circuit, to which said DC output voltage is input, for generating a control voltage according to the regulated DC output voltage;

an ON signal outputting circuit comprising an ON signal generating circuit, and a circuit for preventing the outputting of said ON signal to the switching circuit under light load conditions based on a comparison between the control voltage and a predetermined threshold voltage indicative of the light load condition in said switching regulator; and an OFF signal outputting circuit for outputting said OFF signal to said switch circuit based on the control voltage;

wherein the regulated DC output voltage is maintained substantially constant under both light load conditions and heavy load conditions.

2. The switching regulator controlling system according to claim 1, wherein said ON signal outputting circuit makes the comparison between the control voltage and the predetermined threshold voltage, and does not output the ON signal until entering a state indicating that the output voltage is lower than the predetermined voltage.

3. The switching regulator controlling system according to claim 1, wherein:

said switching circuit includes a flip-flop circuit having a set terminal and a reset terminal; and said ON signal outputting circuit is a set pulse signal outputting circuit for outputting a set pulse to said flip-flop circuit; and said OFF signal outputting circuit is a reset pulse signal outputting circuit for outputting a reset pulse to said flip-flop circuit.

4. The switching regulator controlling system according to claim 3, wherein said set pulse signal outputting circuit includes:

a set pulse signal generating circuit for generating a set pulse signal of a predetermined cycle; and a gate circuit for not outputting the set pulse signal until entering the state indicating that the output voltage is lower than the predetermined voltage.

5. The switching regulator controlling system according to claim 3, wherein:

said set pulse signal outputting circuit includes a comparing circuit for making the comparison between the control voltage and the threshold voltage, and an AND gate; and said comparing circuit outputs a signal to said AND gate when the control voltage exceeds the threshold voltage, so that said set pulse signal outputting means allows the set pulse signal to be output to the set terminal of said flip-flop circuit via said AND gate.

6. A switching regulator controlling system for suppling a regular DC output voltage to a load under heavy load and light load conditions, comprising:

switching means for switching between ON and OFF;

output means for obtaining a regulated DC output voltage by varying a duty of said switching means, for generating an ON signal and an OFF signal, and for changing a rate of the ON signal time and the OFF signal time;

control voltage generating means, to which said regulated DC output voltage is input, for generating a control voltage according to the regulated DC output voltage;

ON signal outputting means comprising an ON signal generating means, and means for preventing the outputting of said ON signal to the switching circuit under the light load conditions based on a comparison between the control voltage and a predetermined threshold voltage indicative of the light load condition in said switching regulator; and an OFF signal outputting means for outputting said OFF signal to said switching circuit based on the control voltage, wherein the regulated DC output voltage is maintained substantially constant under both light load conditions and heavy load conditions.

7. A switching regulator controlling method for suppling a regulated DC output voltage to a load under heavy load and light load conditions and for maintaining the regulated DC output voltage substantially constant under both light load conditions and heavy load conditions, the method comprising the steps of:

obtaining a regulated DC output voltage by varying a duty of a switching circuit for switching between ON and OFF;

inputting the output voltage, and generating a control signal based on the output voltage; and making a comparison between the control signal and a predetermined threshold indicative of the light load condition, and not switching to ON in order to control a duty cycle of the switching circuit under the light load conditions until the output voltage becomes lower than the predetermined value based on a result of the comparison.

* * * * *